United States Patent
Li et al.

(10) Patent No.: US 10,298,757 B2
(45) Date of Patent: May 21, 2019

(54) INTEGRATED SERVICE CENTRE SUPPORT

(71) Applicant: ACCENTURE GLOBAL SOLUTIONS LIMITED, Dublin (IE)

(72) Inventors: Chung-Sheng Li, San Jose, CA (US); Guanglei Xiong, Pleasanton, CA (US); Emmanuel Munguia Tapia, San Jose, CA (US); Kyle P. Johnson, Lawrence, KS (US); Christopher Cole, San Anselmo, CA (US); Sachin Aul, San Francisco, CA (US); Suraj Govind Jadhav, Navi Mumbai (IN); Saurabh Mahadik, Mumbai (IN); Mohammad Ghorbani, Foster City, CA (US); Colin Connors, Campbell, CA (US); Chinnappa Guggilla, Bangalore (IN); Naveen Bansal, Delhi (IN); Praveen Maniyan, Kayamkulam (IN); Sudhanshu A Dwivedi, Bangalore (IN); Ankit Pandey, Bangalore (IN); Madhura Shivaram, Bangalore (IN); Sumeet Sawarkar, Nagpur (IN); Karthik Meenakshisundaram, Bangalore (IN); Nagendra Kumar M R, Bangalore (IN); Hariram Krishnamurth, Chennai (IN); Karthik Lakshminarayanan, Bengaluru (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 15/901,049

(22) Filed: Feb. 21, 2018

(65) Prior Publication Data
US 2018/0241881 A1 Aug. 23, 2018

(30) Foreign Application Priority Data
Feb. 23, 2017 (IN) .............................. 201741006558

(51) Int. Cl.
*H04M 3/51* (2006.01)
*G06N 20/00* (2019.01)
(Continued)

(52) U.S. Cl.
CPC ........ *H04M 3/5183* (2013.01); *G06N 3/0454* (2013.01); *G06N 3/08* (2013.01);
(Continued)

(58) Field of Classification Search
CPC ............. H04M 3/5183; H04M 3/5191; H04M 2203/402; H04M 3/51; H04M 3/523; H04M 2203/403
(Continued)

(56) References Cited

U.S. PATENT DOCUMENTS

2016/0162456 A1* 6/2016 Munro .................... G06F 16/35
704/9
2017/0235848 A1* 8/2017 Van Dusen ............. H04L 41/04
705/12

* cited by examiner

Primary Examiner — Thjuan K Addy
(74) Attorney, Agent, or Firm — Mannava & Kang, P.C.

(57) ABSTRACT

A curator captures input data corresponding to service tasks from an external source. Further, a browser extension collects intermediate service delivery data for the service tasks from the external source. Subsequently, a learner stores the input data and the intermediate service delivery data as training data. Then, a receiver receives a service request from a client. The service request is indicative of a service task to be performed and information associated with the service task. Further, an advisor processes the service request to generate an intermediate service response. Thereafter, the advisor determines a confidence level associated with the intermediate service response and ascertains whether the confidence level associated with service response is below pre-determined threshold level. If the confidence level is below a pre-determined threshold level, (Continued)

the advisor automatically generates a final service response corresponding to service request based on training data.

20 Claims, 11 Drawing Sheets

(51) Int. Cl.
*G06N 7/00* (2006.01)
*H04M 3/523* (2006.01)
*G06N 3/04* (2006.01)
*G06N 3/08* (2006.01)
*G06Q 30/00* (2012.01)
*G06N 5/02* (2006.01)

(52) U.S. Cl.
CPC ............. *G06N 20/00* (2019.01); *G06Q 30/00* (2013.01); *H04M 3/5235* (2013.01); *G06N 5/022* (2013.01); *G06N 7/005* (2013.01); *H04M 3/51* (2013.01); *H04M 2203/403* (2013.01)

(58) Field of Classification Search
USPC ............ 379/265.09, 265.05, 265.01, 265.11, 379/266.01, 265.03, 265.06, 266.08
See application file for complete search history.

US 10,298,757 B2

INTEGRATED SERVICE CENTRE SUPPORT

PRIORITY

The present application claims priority under 35 U.S.C. 119(a)-(d) to Indian patent application number 201741006558, having a filing date of Feb. 23, 2017, the disclosure of which is hereby incorporated by reference in its entirety.

BACKGROUND

Efficient and customer-oriented service delivery is essential for success of any organization. Typically, an input system, such as a service representative, delivers services in various service delivery environments, such as call centers, business process outsourcing, infrastructure outsourcing, application outsourcing, and service desks. During recent years, providing automation such as through robotic process automation (RPA), smart process automation (SPA), and intelligent process automation (IPA) has gained substantial momentum. Currently, the automation approaches are categorized into self-assist delivery models and agent-assist delivery models. The self-assist delivery models are fully automated models where a system or a machine generates a solution or a recommendation for a client without any manual or human intervention. Further, the agent-assist delivery models are semi-automated models where some aspects are automated while other aspects may be handled by a human agent. A technical problem that arises in service delivery is that while self-assist delivery models and agent-assist delivery models may have many advantages individually, however, for most of the aspects, the delivery models are mutually exclusive wherein capabilities of one delivery model cannot be used by the other delivery model. The present disclosure provides a technical solution to the problem that can intelligently assist systems for speedy and effective resolving of customer queries.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
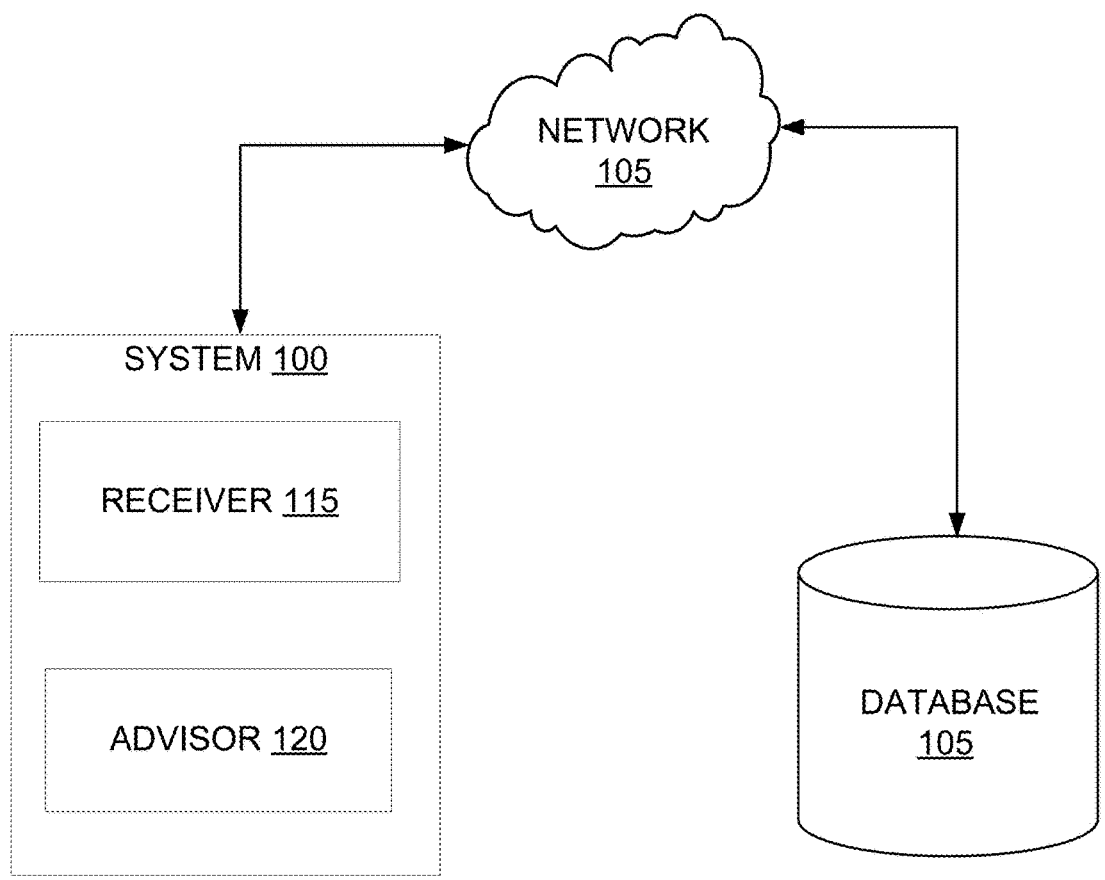
FIG. 1 illustrates a network environment implementing a system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

The present subject matter describes systems and methods for enabling holistic integration of various delivery models in a service delivery environment. The system addresses and assists systems for resolving various types of customer/vendor queries. In an example embodiment of the present disclosure, the system may include a receiver and an advisor. The receiver and the advisor may be in communication with each other to perform the functionalities of the system. The system may also be referred to as an integrated service centre support system.

Further, in an example embodiment, the system may be communicatively coupled to a database through one or more communication links. The database may store input data corresponding to a plurality of service tasks and intermediate service delivery data. The input data includes data, such as question/answer pairs and dialog traces corresponding to each of the plurality of service tasks. For instance, a question/answer pair for a mobile device 'X' support may be a) Question—"Does the mobile device 'X' support a fast charging tech"? b) Answer—"Yes, it does". Another example of a question/answer pair for the mobile device 'X' support may be a) Question—"What charger does the fast charging"? b) Answer—"You need a charger that is 3 amps at 5 volts to take full advantage".

In an example, the input data and the intermediate service delivery data may be collected from external sources, such as external systems. Further, examples of service tasks include, but are not limited to, technical support and classification of advertisements against a set of policies. Whenever the system receives a service task to be performed from a client, the system retrieves the input data and the intermediate service delivery data from the database.

According to an example embodiment of the present subject matter, the system may initially be trained with the input data and the intermediate service delivery data corresponding to the plurality of service tasks using machine learning techniques. The input data and the intermediate service delivery data may also be referred to as training data. Further, the training of the system may or may not be performed in real-time.

For the purpose of processing a service task, the receiver of the system of the present subject matter may receive a service request from a client. In an example, the service request is indicative of the service task to be performed and information associated with the service task. Further, the service task to be performed may be one of the plurality of service tasks whose data is stored in the database. Then the service task received from the client is processed through the system. The service task is processed based on the training of the system.

Once the service request is received from the client, the advisor of the system processes the service request to generate an intermediate service response corresponding to the service request. The service request may be processed based on pre-stored information in the system. In an example, the intermediate service response may be understood as a solution to the service request. Further, the intermediate service response may be generated as an intermediate recommendation. Subsequently, the advisor may determine a confidence level associated with the intermediate service response. The confidence level associated with the intermediate service response may be determined based on a confusion matrix.

According to an example implementation, the advisor may further ascertain whether the confidence level associated with the service response is below a pre-determined threshold level. On ascertaining that the confidence level is below the pre-determined threshold level, the advisor automatically may generate a final service response corresponding to the service request based on the training data. In an instance, the final service response is generated as a final recommendation. Further, as described above, the training data includes the input data and the intermediate service delivery data.

The system of the present disclosure may offer efficient, reliable, and accurate processing of the service request. The system incorporates external systems' inputs i.e., knowledge from curated question/answers pairs and dialog traces from the external systems to generate final recommendations. The system gathers the knowledge from unstructured and semi-structured sources and assists adjudicative systems for taking decisions in resolving various types of service requests. Such a holistic integration various delivery models may lead to better, efficient, and holistic service delivery FIG. 1 illustrates a network environment implementing a system 100, according to an example embodiment of the present disclosure. The system 100 may also be referred to as an integrated service centre support system. In an example embodiment, the system 100 may be used for processing service requests received from clients to generate recommendations. In an example, the service requests may be related to technical support, classification of advertisements against a set of policies, and other such requests.

In an example embodiment, the network environment may be a public network environment, including numerous of individual computers, laptops, various servers, such as blade servers, and other computing devices. In another example embodiment, the network environment may be a private network environment with a limited number of computing devices, such as individual computers, servers, and laptops. Furthermore, the system 100 may be implemented in a variety of computing systems, such as a laptop, a tablet, and the like.

According to an example embodiment, the system 100 is communicatively coupled with a database 105 through a network 110. The database 105 comprises input data corresponding to a plurality of service tasks and intermediate service delivery data. The input data includes data, such as question/answer pairs and dialog traces corresponding to each of the plurality of service tasks. The input data and the intermediate service delivery data may collectively be referred as training data. In an example, the input data and the intermediate service delivery data may be collected from external sources, such as external systems. Further, examples of service tasks include, but are not limited to, technical support and classification of advertisements against a set of policies. The input data may include question/answer pairs and dialog traces corresponding to each of the plurality of service tasks.

The database 105 may include any other suitable information related to the plurality of service tasks. Further, the database 105 may be accessed whenever a service task is to be processed by the system 100. Furthermore, the database 105 may be periodically updated. For example, new data may be added into the database 105, existing data in the database 105 may be modified, or non-useful data may be deleted from the database 105.

In an example embodiment, the network 110 may be a wireless network, a wired network, or a combination thereof. The network 110 may also be an individual network or a collection of many such individual networks, interconnected with each other and functioning as a single large network, e.g., the Internet or an intranet. The network 110 may be implemented as one of the different types of networks, such as intranet, local area network (LAN), wide area network (WAN), the internet, and the like. Further, the network 110 may include a variety of network devices, including routers, bridges, servers, computing devices, storage devices, and the like.

According to an example embodiment, the system 100 may include a receiver 115 and an advisor 120. In an example embodiment, the receiver 115 and the advisor 120 may be in communication with each other to perform the functionalities of the system 100.

Initially, the receiver 115 receives a service request from a client. In an example, the service request is indicative of the service task to be performed and information associated with the service task. In an example, the receiver 115 may receive the service request in a chat box, virtual assistant environment, or in a question/answer environment. Further, the service task to be performed may be one of the plurality of service tasks whose data is stored in the database 105. Upon receipt of the service task, the service task is processed through the system 100. In an example, the service task may be to classify text in an advertisement against a set of policies that are organized as an ontology. Further, the information associated with the service task may be the text corresponding to the advertisement.

Once the service request is received from the client, the advisor 120 of the system 100 processes the service request to generate an intermediate service response corresponding to the service request. The service request may be processed based on pre-stored information in the system. In an example, the intermediate service response may be understood as a solution to the service request. Further, the intermediate service response may be generated as an intermediate recommendation. Subsequently, the advisor 120 may determine a confidence level associated with the intermediate service response. The confidence level associated with the intermediate service response may be determined based on a confusion matrix. In an example, the confidence level may be directly proportional to the ambiguity level of the intermediate service response. More ambiguous the intermediate service response is, the confidence level will also be low.

According to an example implementation, the advisor 120 may further ascertain whether the confidence level associated with the service response is below a pre-determined threshold level. The pre-defined threshold level can be considered to determine which of the recommendation output needs inputs from the external system.

On ascertaining that the confidence level associated with the service response is above the pre-determined threshold level, the advisor 120 may then provide the intermediate service response to an external system, for final validation for accurate recommendations generation. According to said example, the validation may be performed on randomly selected recommendations. The advisor 120 may then finalize the intermediate recommendation based on validation from the external system.

Further, on ascertaining that the confidence level is below the pre-determined threshold level, the advisor 120 may extract the training data from the database 105 and generate a final service response corresponding to the service request based on the training data. In an instance, the final service response is generated as a final recommendation. The training data includes external system's inputs. In an example, the external system's inputs are solicited for clarifying confusing scenarios.

According to an example embodiment, the system generated intermediate results are provided to an external system and inputs are solicited from the external system. In one example, after the advisor 120 performs initial analysis, classification, and reasoning, the results are displayed to the external system. The external system can then provide inputs to disambiguate any confusions or correct inaccurate recommendations.

As described above, the training data includes the input data and the intermediate service delivery data. Further, the input data includes question/answer pairs and dialog traces corresponding to each of the plurality of service tasks. The question/answer pairs bootstrap the ability of the advisor 120 to either answer questions in the question/answer environment or conduct a dialog in the chat box or the virtual assistant environment.

In an example, every new question answered by an external system can be a valuable resource. Such a new question and its associated answer are made part of the training data. If the client asks the same question then the system 100 can answer automatically. In effect, knowledge of the external systems is transferred to the system 100, thus making the system 100 more efficient. The manner in which system 100 generates the recommendation for the service task is further described in detail in conjunction with FIG. 2.

Figure 2:
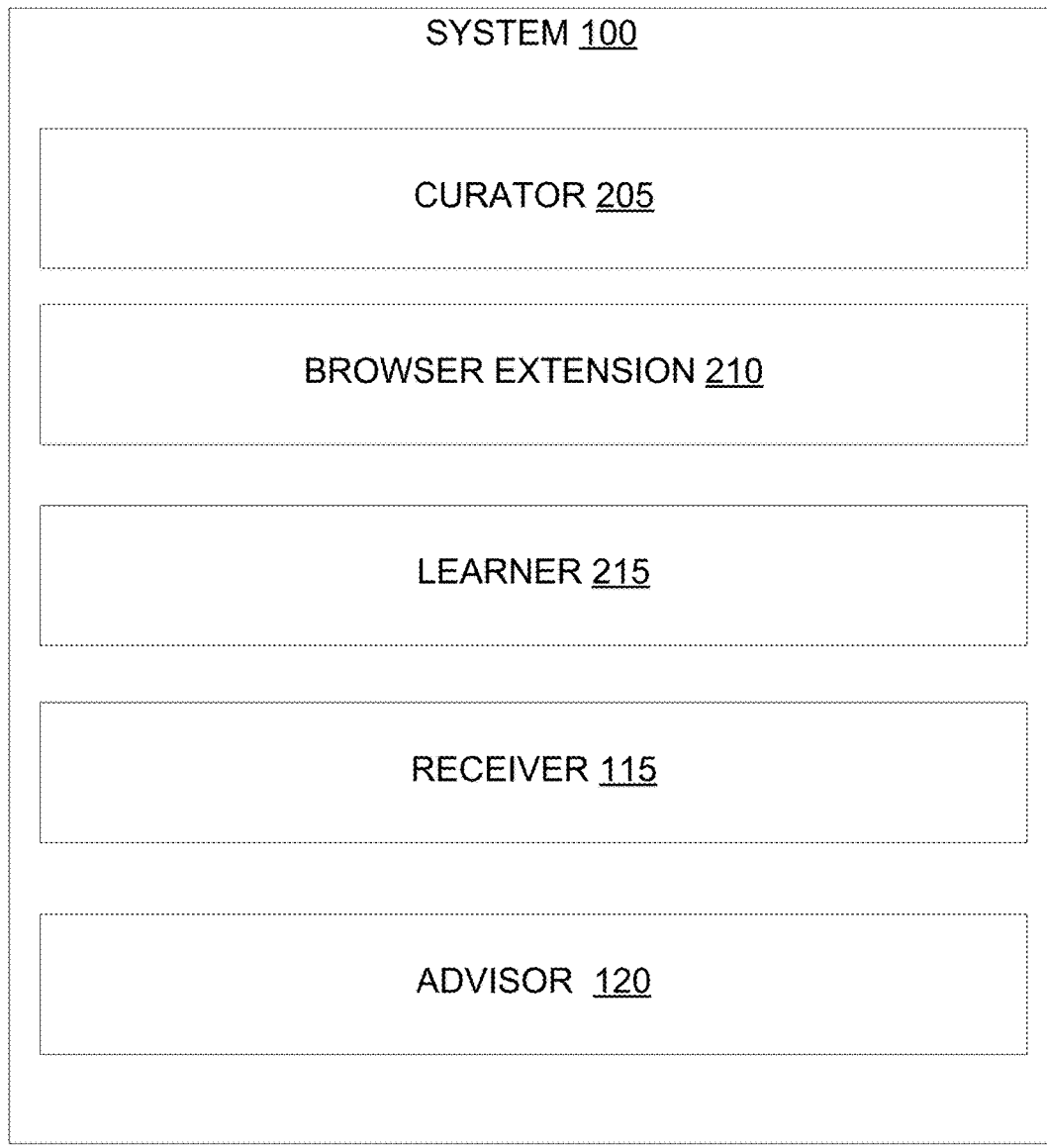
FIG. 2 illustrates a block diagram of the system, according to an example embodiment of the present disclosure.

FIG. 2 illustrates a block diagram of the system 100, according to an example embodiment of the present disclosure. As described above, the Artificial Intelligence (AI) based system 100 may include the receiver 115 and the advisor 120. In an example embodiment, the system 100 includes a curator 205, a browser extension 210, and a learner 215. Further, in an example embodiment, the curator 205 may be in communication with the browser extension 210, and the browser extension 210 may be in communication with the learner 215.

In an example embodiment, the curator 205 may capture input data corresponding to a plurality of service tasks from an external source, such as an external system. The input data includes question/answers pairs and dialog traces corresponding to each of the plurality of service tasks. In an example, the curator 205 collects and curates recommendations for the plurality of service requests from the external system. The recommendations provided by the external system are final recommendations with respect to the service requests. By curating such final recommendations, insightful data can be generated and used for training the system 100.

Further, the browser extension 210 may collect decisions made by the external system during the process of providing recommendations. Such intermediate decisions may provide insight on how the decision-making process evolves leading to the recommendations. The manner in which the browser extension 210 collects decisions made by the external system is further described in detail in conjunction with FIG. 3.

Thereafter, the learner 215 stores the input data and the intermediate service delivery data or the intermediate information as training data in the database 105. In an example, the training data is remotely stored in the learner 215. Further, the collected data may be used to continuously train and test the system 100 on how to come to a particular final recommendation and what steps or decision routes should be taken to come to a final recommendation. The advisor 120 can interact with the database 105 to generate a more accurate final recommendation.

According to an example implementation, the receiver 115 receives a service request from a client. The service request is indicative of a service task to be performed and information associated with the service task. In an example, the service task may to classify text in an advertisement against a set of policies that are organized as ontology. Further, the advisor 120 may process the service request to generate an intermediate service response corresponding to the service request. The intermediate service response is generated as an intermediate recommendation. In an example, the advisor 120 may generate the intermediate service response by performing analysis, classification, and reasoning methodologies on the service request.

Subsequently, the advisor 120 may determine a confidence level associated with the intermediate service response. In an example, the advisor 120 determines the confidence level associated with the intermediate service response based on a confusion matrix. Then the advisor 120 may ascertain whether the confidence level associated with the service response is below a pre-determined threshold level. On ascertaining that the confidence level is below the pre-determined threshold level, the advisor 120 may extract the training data from the database 105. In an example, if ambiguity exists in the generated intermediate service response, then the advisor 120 solicit additional input from the external system for clarifying confusing scenarios, following which final recommendations are made by the advisor 120.

According to an example embodiment, the advisor 120 may automatically generate a final service response corresponding to the service request based on the training data. The final service response is generated as a final recommendation. Thus, the final recommendation is made with high enough confidence level. The manner in which advisor 120 incorporates external system inputs in the process of producing machine-generated recommendation is further described in detail in conjunction with FIG. 4.

The present disclosure thus provides a collaborative model for the external system to provide assistance to machine generated recommendations. In the present disclosure, the system 100 enables external systems to participate in the process of generating machine generated recommendations for service tasks. This may result into improved results in comparison to individual results generated by the system alone. Further, the results curated by the external systems are continuously collected for training the system 100. As a result, continuous and incremental learning is achieved. Furthermore, the integration of various delivery models enables the overall support in reaching better performance in comparison to system alone approaches. Also, the proposed system is scalable and domain independent that can be used across domains and can intelligently assist external systems for speedy and effective resolving of service requests by using auto-learned and process specific knowledge-base and reasoning techniques. In addition, the system can also address some of the service requests automatically without external systems in the loop. Thus, the process of generation of recommendations for the service requests is performed by the system 100 in an efficient and an accurate manner.

Figure 3:
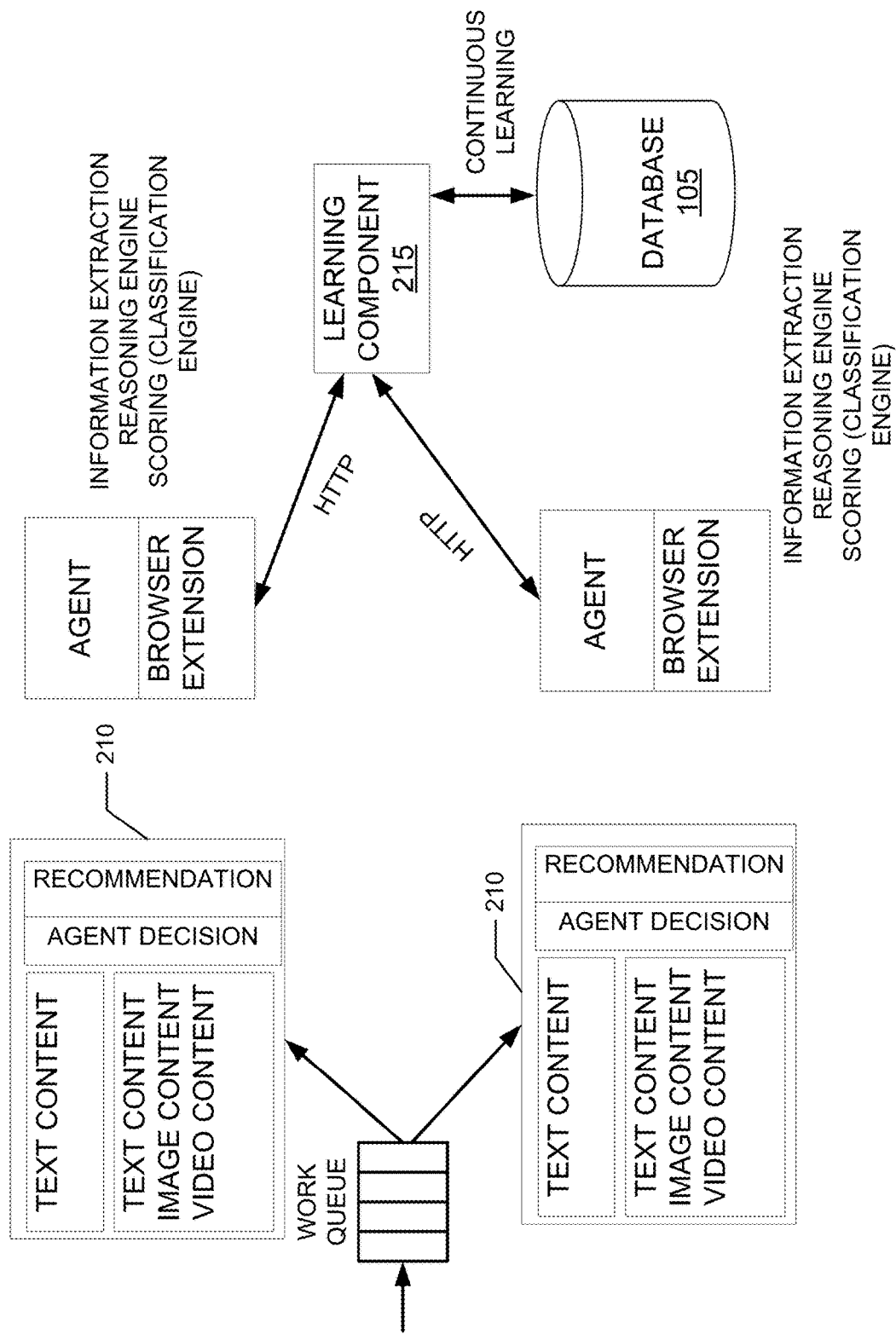
FIG. 3 illustrates a block diagram where intermediate information is collected using a browser extension according to an embodiment of the present disclosure.

FIG. 3 illustrates a block diagram 300 where intermediate information is collected using a browser extension 210 according to an embodiment of the present disclosure. The browser extension 210 may be a component such as, for example, a plug in that extends the functionality of a web browser.

As can be seen in FIG. 3, intermediate decisions or deliberations made by the external system are continuously collected by the browser extension 210 without interfering with a primary data path where the final recommendations by the external system are being made. The browser extension 210 may be used for collecting intermediate information. Specifically, the browser extension 210, in a browser, may open a task in a queue while the browser extension 210 performs actual scoring, evaluation, and recommendation. The browser extension 210 then provides the intermediate information collected from the external system to the learner 215 via Hypertext Transfer Protocol (HTTP). In an example, the learner 215 may be a centralized back-end server. The learner 215 then stores the intermediate information in the database 105 for training of the system 100.

Figure 4:
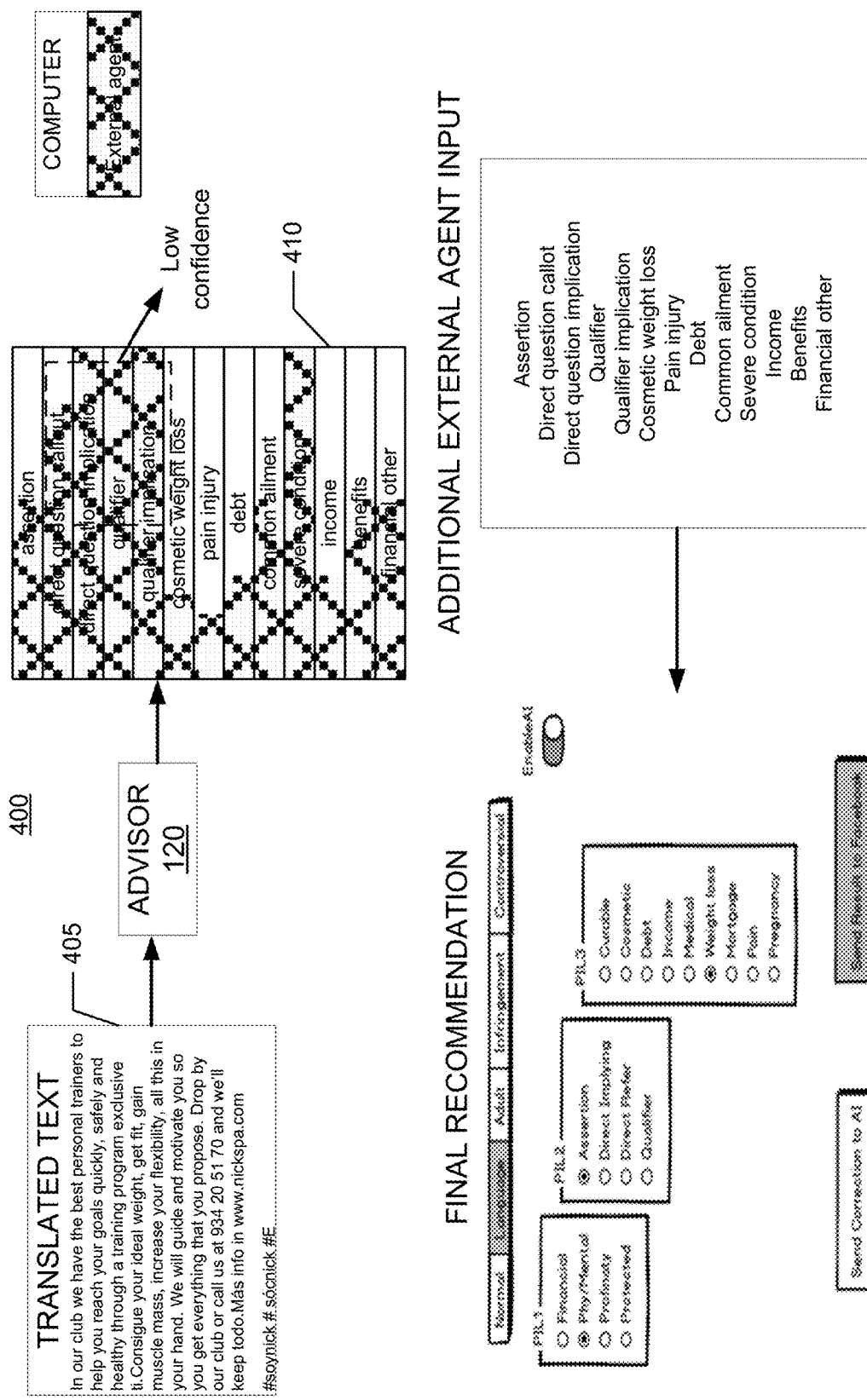
FIG. 4 illustrates a process for incorporating external system inputs in the system generated recommendation according to an embodiment of the present disclosure.

FIG. 4 illustrates a process 400 for incorporating external system inputs in the system generated recommendation according to an embodiment of the present disclosure.

As can be seen in FIG. 4, a text corpus 405 from a service request is provided as an input to the advisor 120. The text corpus 405 includes text from the service request providing information about a situation. There may be insights that can be generated from the content in the text corpus 405. In an embodiment, natural language understanding techniques and natural language architectures may be used to generate the insights, which results in the advisor 120 generating recommendation outputs.

In an example embodiment, confidence intervals are calculated for the each of the recommendation outputs. Each of the recommendation outputs can have varying confidence levels. Some recommendation outputs may have higher confidence levels while others may have acceptable confidence levels. For example, the recommendation output "qualifier" has a lower confidence level in comparison to "cosmetic weight loss" recommendation output. As another example, the recommendation output "benefits" has a lower confidence level in comparison to "income" recommendation output. The advisor 120 then solicits external system's inputs 410 for the machine recommendations for at least the results with lower confidence levels. A confidence level threshold can be considered to determine which of the recommendation output needs inputs 410 from the external system. After inputs 410 from the external system are received, a recommendation is finalized.

Figure 5:
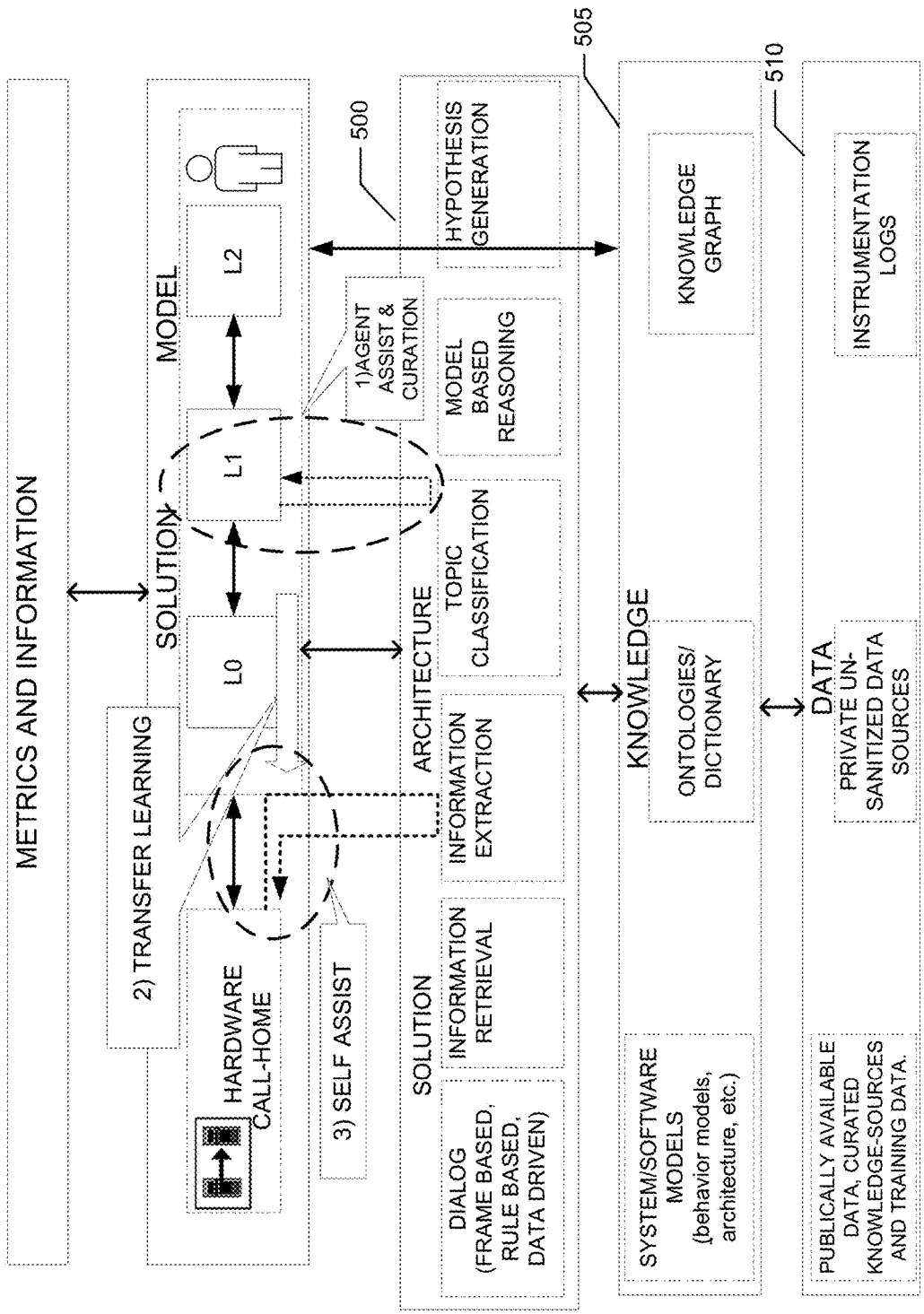
FIG. 5 illustrates an integrated solution model for holistic integration of external system inputs and the system generated recommendations, according to an example embodiment of the present disclosure.

FIG. 5 illustrates an integrated solution model 500 for holistic integration of external system inputs and the system generated recommendations, according to an example embodiment of the present disclosure.

In an example, during a bootstrapping phase of deployment of a new service, enabling service for a new product, or starting a new process, a plurality of service requests are received. Further, if it is determined that any of the service requests includes insufficient statistics, then insufficient statistics are gathered from external sources, such as external systems. Further, the service requests that are deemed ambiguous or no answers exist for then, may be passed on to the external systems. Further, recommendations or solutions for such service requests are collected from the external systems and are curated.

As can be seen in FIG. 5, the integrated solution model 500 is used to curate the recommendations made by the external systems. The integrated solution model 500 interfaces with knowledge repositories 505 and various data sources 510. The knowledge repositories 505 can include software models such as behavior model, ontologies, dictionaries, knowledge graphs, etc. Data from various sources is stored in databases, which can be accessed by the knowledge repositories 505 to enable the integrated solution model 500 to curate the recommendations made by the external systems. In an example implementation, the curated data may become a training set for the system 100. Further, machine learning techniques may be used for transferring the curated data to the system 100. Thus, results curated by external systems are collected and made part of the training set for the system 100.

Figure 6:
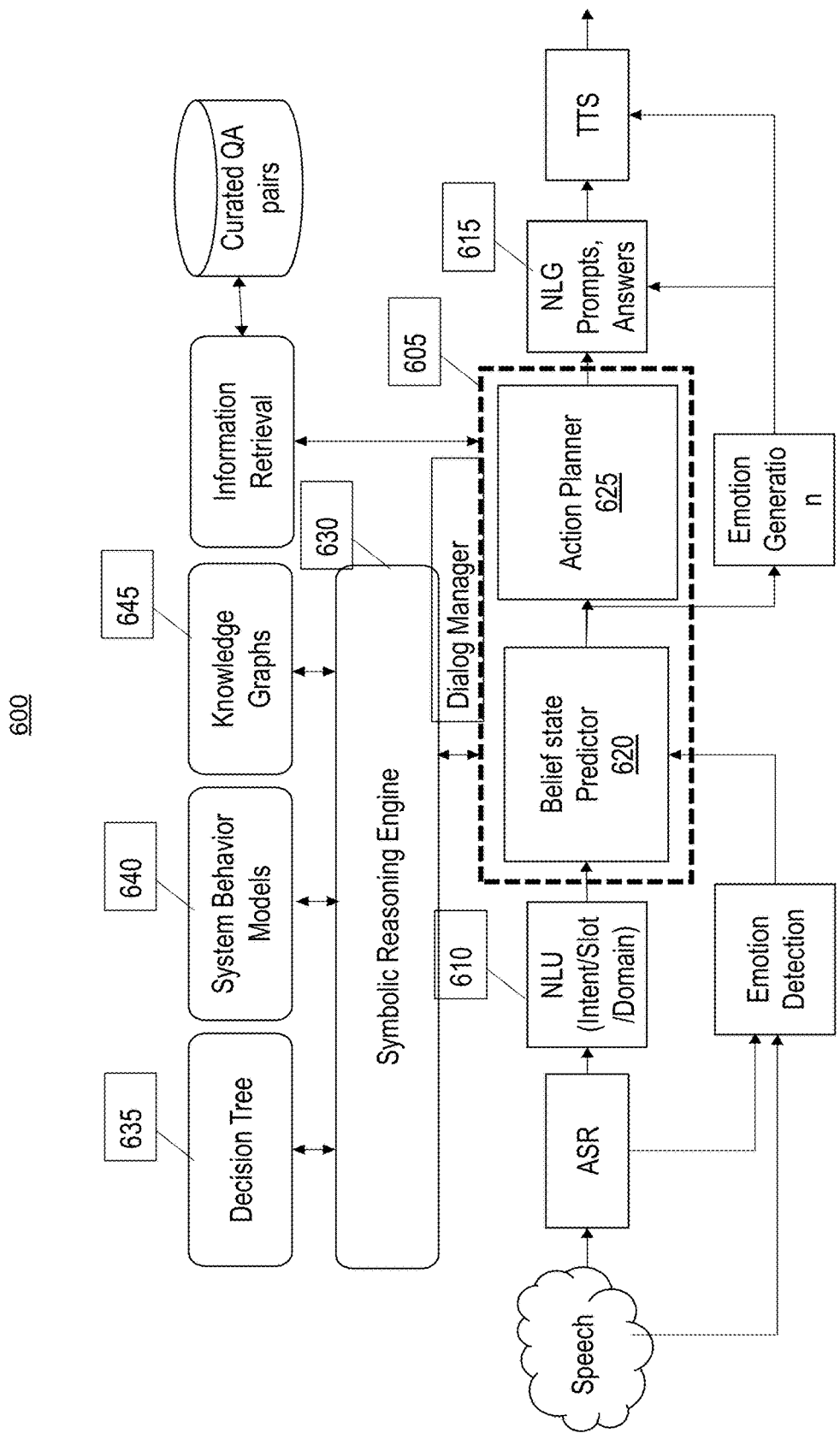
FIG. 6 illustrates a block diagram of an integrated cognitive tech support system, according to an embodiment of the present disclosure.

FIG. 6 illustrates a block diagram of an integrated cognitive tech support system 600 according to an embodiment.

The integrated cognitive tech support system 600 provides an interface between a user and a computer-based application. The integrated cognitive tech support system 600 includes a dialog manager 605. The dialog manager 605 controls the flow of dialog. Further, the dialog manager 605 gathers information from the user, communicates with external applications, and communicates information back to the user. In an embodiment, the dialog manager 605 may be a finite state or graph-based system, a frame-based system, or any combination thereof.

The dialog manger 605 interfaces with a natural language understanding system 610 and a natural language generation system 615. The dialog manager 605 includes a belief state predictor 620 and an action planner 625. The integrated cognitive tech support system 600 further includes a symbolic reasoning engine 630 that interfaces with a decision tree 635, system behavior models 640, and knowledge graphs 645. In an embodiment, the dialog manager 605 interfaces with the symbolic reasoning engine 630 to generate an action plan based on the knowledge pertinent to a service domain. For example, an action plan can be generated based on knowledge such as industry-specific knowledge, client-specific knowledge, or other types of knowledge.

Figure 7:
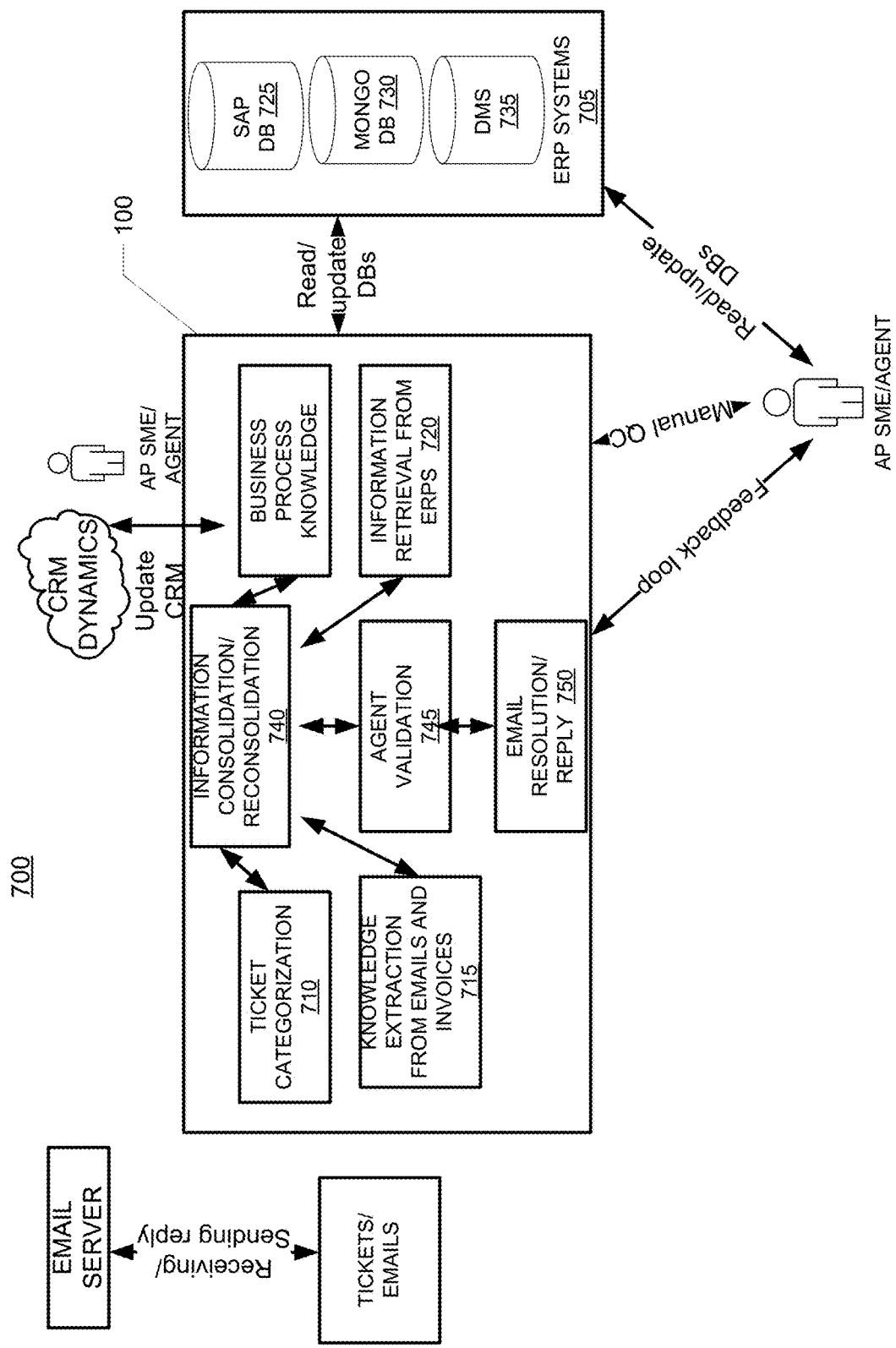
FIG. 7 illustrates an exemplary system for resolving customer queries, according to an embodiment of the present disclosure.

FIG. 7 illustrates an exemplary system 700 for resolving customer queries, according to an embodiment of the present disclosure.

According to an example embodiment, the system 100 employs various advanced Natural Language processing (NLP), Information Extraction (IE), and Machine Learning (ML)/Deep Learning (DL) methods to categorize various types of customer queries including information fetching queries, language analysis and reasoning based queries, computational/arithmetic queries, and instructive and investigative types of queries. In an example, the system 100 employs advanced DL-based cascaded ML techniques to identify intents of a ticket query to be used for resolution for the external systems.

In an example, when a vendor asks for the status of an invoice and sends a query in an email, then ticket will be created for this query. In this case, an external system may respond to the vendor by understanding the email content, extracting required information related to the invoice in different Enterprise Resource Planning (ERP) systems 705, and performing a series of actions and update the status in the template. The system 100 assists the external system with required information for updating the required status in the ERP systems 705 for future reference.

According to an example embodiment, a ticket categorization component 710 of the system 100 reads ticket description included in the email and understands the intent of the email with specific ticket category, also referred to as invoice category. Further, the ticket categorization component 710 employs advanced deep learning techniques, such as convolutional neural networks (CNN) along with classical machine learning techniques to classify the given ticket into predefined set of ticket categories/intents/sub-intents with confidence scores.

Figure 8:
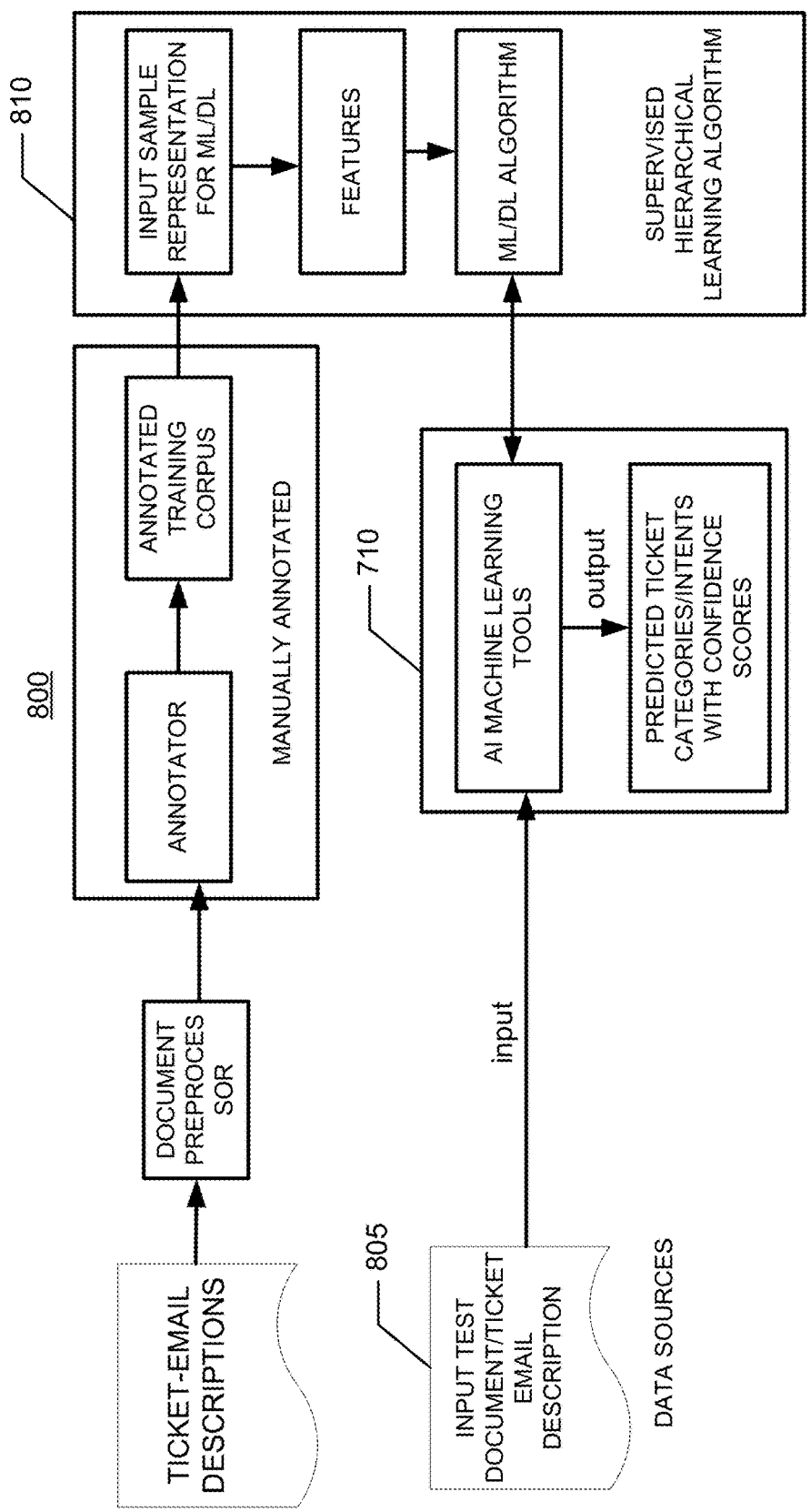
FIG. 8 illustrates a ticket categorization process, according to an example embodiment of the present disclosure.

FIG. 8 illustrates a ticket categorization process 800, according to an example embodiment of the present disclosure.

Initially, historical corpus 805 of ticket descriptions and corresponding set of ticket types (intents) and sub-types (sub-intents) which are denoted as labels are fed into the ticket categorization component 710. The ticket categorization component 710 then performs the ticket categorization and splits it into various training, validation and test sets. In case there are any ambiguities in identifying ticket categories, the ticket categories can be further reviewed by external systems. Thereafter, the ticket categorization component 710 prunes various spurious and noisy features from the email thread using pattern-based approach.

Subsequently, the ticket categorization component 710 extracts different types of features ranging from unigram, bigrams to numeric, and alpha numeric from the email description, and performs various preprocessing tasks, such as stemming, stop word removals and lemmatization on the email descriptions using NLP techniques. In an example, the ticket categorization component 710 compiles features 810, such as embedding features (semantic features) from both the email descriptions and subject using word2vec algorithms. In an example, the embedding dimensions may vary from 50-300.

The ticket categorization component 710 may then represent each email description with subject into embedding semantic space and this will act as input to the n-layered convolutional deep neural networks. The learning processes are optimized with various parameters such as sample batch size, feature window sizes, optimization techniques, number of layers, number of iterations, number of semantic features dimensions, etc. In an example, the ticket categorization component 710 automatically learns patterns and ticket intents from the historical corpus 805 and for a given input email ticket, the ticket categorization component 710 predicts the correct ticket category/intent with high confidence scores.

According to the example embodiment, the ticket categorization component 710 predicts the ticket categories with high-accuracy. The ticket categorization component 710 selects the highly confident, mid and low confident predictions by varying confidence threshold from 0.9 to 1 which can help the external systems to quickly take decisions based on the confidence level and provide their recommendation. Accordingly, with the help of minimal features, the system 100 can automatically infer variations of various vocabularies and can handle unseen semantic variants present in the completely unseen email descriptions.

Continuing with the description of FIG. 7, a knowledge extraction component 715 of the system 100 extracts information from digitized and non-digitized invoice documents and email query content. In an example, the knowledge extraction component 715 extracts the information based on ML/DL techniques, such as Conditional random fields (CRF) and Long short-term memory deep neural networks. In an example, the knowledge extraction component 715 reads the ticket description encoded in email along with the subject of the email, and understands the intent of the email with specific invoice (ticket) category. In an example, the knowledge extraction component 715 can read attached invoice copies and email description, and identify information, such as invoice number, invoice date, various types of amounts, address details, currency and other required information required for providing the resolution. External systems may use this information and provide the resolution quickly.

The knowledge extraction component 715 uses existing Optical Character Recognition (OCR) tools to convert the documents into Hypertext Markup Language (HTML) or textual format useful for various automation tasks. The knowledge extraction component 715 consumes the converted text for machine learning purpose. The knowledge extraction component 715 may employ advanced deep learning technique called long short-term memory deep neural networks (LSTMs) and its variant techniques (Bi-directional LSTM) with efficient invoice representation to extract key knowledge required for aiding the external system to provide quick resolution. Example invoice copy and entities are illustrated in below example.

| XYLDEP Bonnect | Invoice# IN0006789345 |
|---|---|
| Unit 5, xyz park, ABC Estate, | Invoice No: IN00023451 |
| RTU Rd., Kingtown, BANGLORE 11, INDIA | Invoice Date: |
| | Jan. 1, 2016 |
| VAT: IEA45673K. MEEE: 001234 | Account No: C022123 |
| E-mail: accountsreceiveable@xyz.com | Currency; EUR |
| Phone: +123 (0)1 882666. | Your Ref: 123456 |
| Fax: +123 (0)1 8821111 | |
| INVOICE TO | |
| XYZ-XYZ IT Helpdesk | |
| Block XYZ-The ABC-, cft Road-, | |
| BBM Industrial | |
| Estate- | |
| Co. India | |
| India 13 | |
| Customer VAT No: 1E84 | |

| Line | Item | Description | Qty | Price | Total |
|---|---|---|---|---|---|
| 1 | 12345| | XYZ BX2 Edge for Surface Book at" Smoke Gray | 10 | 123.48 | 789.60 |
| | | Sub-Total | | EUR | 749.60 |
| | | VAT | | EUR | 0.00 |
| | | Total | | EUR | 749.60 |

The knowledge extraction component 715 uses existing Optical Input: Historical corpus of email descriptions and corresponding invoice documents containing information related to various purchase orders and invoices. Predefined set of entities and annotated invoice textual/html documents an email description with various entities.

Figure 9:
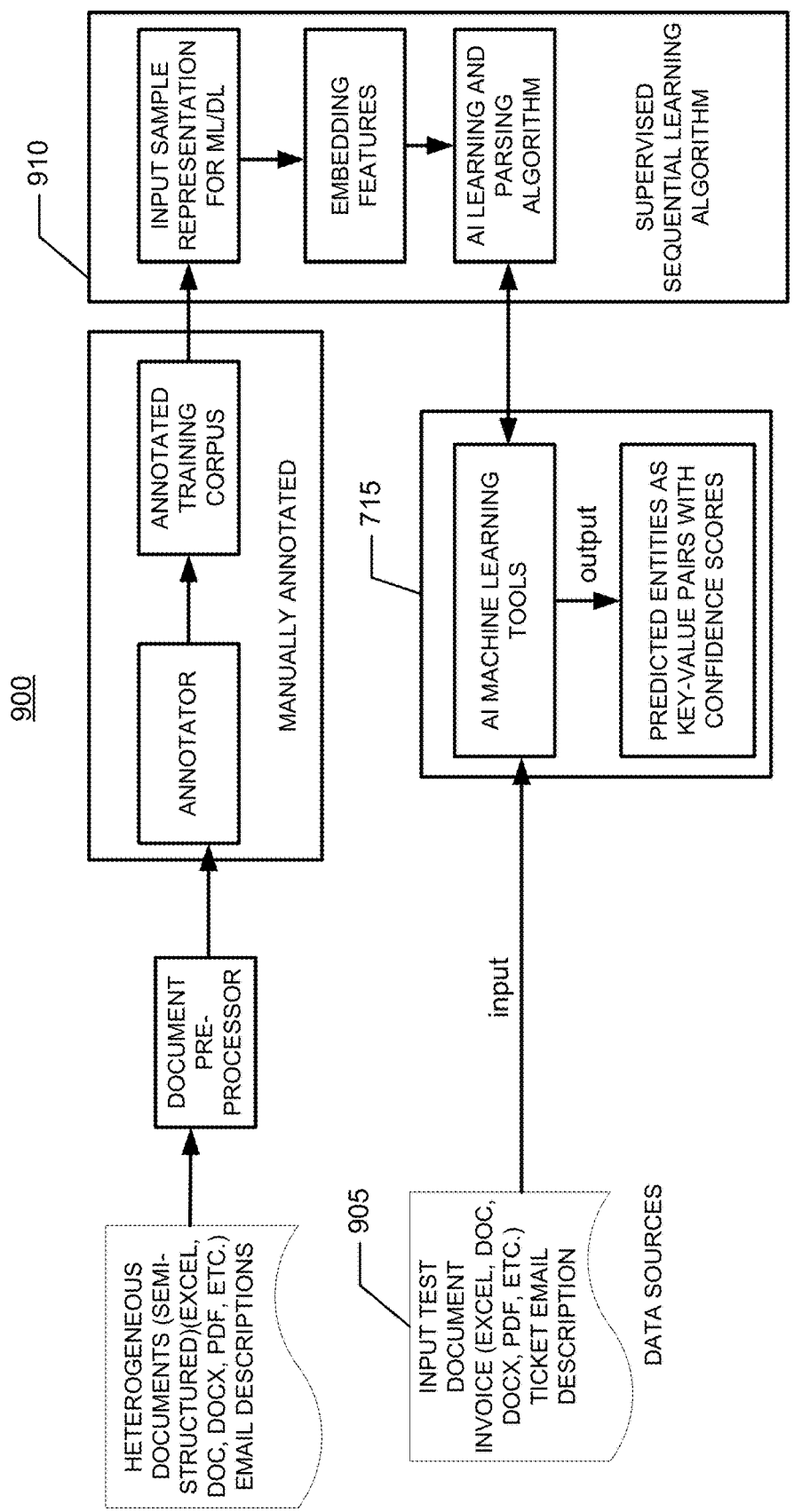
FIG. 9 illustrates a knowledge extraction process, according to an example embodiment of the present disclosure.

FIG. 9 illustrates a knowledge extraction process 900, according to an example embodiment of the present disclosure.

Initially, a historical training set 905 of invoice textual/html documents is fed into the knowledge extraction component 715. The knowledge extraction component 715 performs the ticket sampling and split into various training, validation and test sets. Thereafter, the knowledge extraction component 715 prunes out very noisy and missing content types of invoice copies based on quality analysis and retains the valid invoice copies with minimal noise.

The knowledge extraction component 715 then performs right segmentation of invoice copy based on sequence of lines and separators present in the invoice text. The knowledge extraction component 715 formulates meaningful chunks, also referred to as pseudo block of chunks, required to extract entities correctly, and denotes them as minimal sample text. Further, the knowledge extraction component 715 compiles features 910, such as embedding features (semantic features) for all the entities present in the historical training set 905 using use word2vec algorithms. In an example, the embedding dimensions may vary from 50-300.

Subsequently, the knowledge extraction component 715 represents each pseudo block of chunks into embedding semantic space to act as an input for deep Long Short-Term memory (LSTM) networks. Accordingly, the knowledge extraction component 715 automatically learn patterns specific to each entity from the historical training set 905, and for a given input invoice text, the knowledge extraction component 715 predicts the right set of entities and values with high confidence scores.

According to an example embodiment, the knowledge extraction component 715 predicts the key entities and values with high-accuracy and is scalable. The knowledge extraction component 715 selects highly confident, mid and low confident predictions by varying confidence threshold from 0.9 to 1 which can help the external systems to quickly take decisions based on its confidence and provide their recommendations. Accordingly, with the help of minimal features, system 100 can automatically infer variations of various vocabulary and can handle unseen semantic variants present in the completely unseen email descriptions.

Continuing with the description of FIG. 7, an information retrieval component 720 of the system 100 retrieves various types of information from external Enterprise Resource Planning (ERP) systems 705 and dynamically updates these ERP systems 705. In an example, information specific to the invoice state and processing state are stored in the ERP systems 705.

According to an example embodiment, the information retrieval component 715 extracts data such as invoice number, purchase order number, vendor name, and vendor ID along with the ticket query type/intent from the ERP systems 705. The extracted data is then used by the information retrieval component 720 to query Systems Application and Products (SAP) database 725, where information about the invoices are manually entered by the external systems. If the record is found in the SAP database 725, then it can be inferred that the invoice is already processed as external systems make this entry only when the invoices are processed, the information retrieval component 720 then directly responds to the requestor by noting down the invoice due date and compose an automated email by selecting the relevant email template.

Further, in case the invoice record is not found in the SAP database 725, the information retrieval component 720 checks the invoice record in Document Management System (DMS) 735, in certain circumstances, the invoices get rejected. If it's a rejection case, then the rejection description can be found in DMS 735. In such cases, the information retrieval component 720 can directly select the appropriate email template with the rejection description and respond to the requestor.

According to an example implementation, an information conciliation component 740 of the system 100 aggregates information from various sources and performs intelligent reconciliation of information before presenting it to the end user for resolving the tickets. In an example, the information conciliation component 740 employs semantics and lexical based matching and ranking techniques for reconciling the information. Once the information conciliation component 740 aggregates the information, the information conciliation component 740 performs validations based on business rules and performs reconciliation.

Initially, the information conciliation component 740 is fed with knowledge extracted from email descriptions, entities, values, confidence scores, and invoice documents using statistical ML/DL methods and business based knowledge approach as described above. Further, the information conciliation component 740 employs priority/weight-based approach on extracted entities and values from different algorithms to select the highly confident fields using NLP/DL-based word2vec semantic similarity and cosine distance measures along with text fuzzy matching. In an example, the algorithm provides with matched semantic similarity scores between entities and the values. Further, the information conciliation component 740 sets a threshold of greater than equal to 0.90 (range is from 0 to 1) and retain the high confident entities and values among algorithms. Accordingly, the information conciliation component 740 obtains consolidated entities and values and rank them in order based on confidence scores.

Thereafter, the information conciliation component 740 applies the business knowledge such as rules, conditions, and constraint on top of ranked entities and values and filters out the false positives and retains the ranked entities and values. The information conciliation component 740 applies reasoning techniques. For example, if there are multiple currency values which are extracted from the invoices. The information conciliation component 740 can infer the right currency from the originated invoice/vendor region. Finally, the information conciliation component 740 validates whether the extracted entities are accurate and reliable.

According to an example embodiment, an agent validation component 745 of the system 100 segregates those tickets that can be resolved by the system 100 itself and the tickets that requires human assistance to resolve the tickets. In an example, the agent validation component 745 of the system 100 employ machine learning-based probabilistic and ranking approach to isolate agent-assisted and system resolved tickets. Initially, 'n' number of confidence scores emitted from the ML/DL algorithms both for the ticket category/intents and for the entities and values, the agent validation component 745 devises the confidence intervals based on thresholds.

Subsequently, the agent validation component 745 classifies the confidence intervals into three predefined levels—high, mid and low. In an example, the agent validation component 745 sets high range between 0.9 and 1.0, mid-range between 0.5 and 0.9, and low-range between 0 and 0.5. In an example, the agent validation component 745 estimates the confidence intervals using trial and error method using 'm' number of ticket predictions for categories, entities and values. Using the set thresholds, the agent validation component 745 determines a total number of tickets that are highly accurate, a total number of tickets that are partially accurate, and a total number of tickets that are not accurate. The agent validation component 745 consider those tickets that fall in 'high' range as potential tickets that can be resolved without human touch and 'mid' range tickets as those tickets that requires human touch and 'low' classified tickets will not be passed for the human verification and these tickets can be solved manually by external systems.

According to an example embodiment, an email resolution component 750 of the system 100 resolves the tickets by updating required information in various ERP systems 705 such as CRM, SAP, etc and sends relevant email reply by incorporating ticket problem specific information in the email reply. In an example, the email resolution component 750 generates email reply using advanced natural language generation and user-defined template methods. According to said example, the email resolution component 750 uses ticket intent/category specific reply templates to send a reply to the vendor by enclosing the required information for the requested ticket. The email resolution component 750 may also employ ML/DL based automatic email reply language generation method to compose an email reply.

Initially, invoice state/status information is retrieved from the ERP systems 705, static email reply templates, business specific rules/knowledge, taxonomy and the identified knowledge. The email resolution component 750 may receive a ticket request from a vendor. In an example, different types of ticket requests have different types of categories. Depending on the category of input request, external system composes different types of email. This information is encoded in taxonomy format and constructed using business process specific knowledge. Taxonomy consists of key invoice information, state and information relevant to the intended vendor and right email template.

According to an example template, the email resolution component 750 fills the email reply template based on taxonomy nodes and composes the email reply with necessary information in the selected right template. The email resolution component 750 may also employ DL-based email reply generation techniques as an alternate method for forming the email reply. Further, in some cases, where the ticket category is not correct, then in such cases, already selected email reply template needs to be changed/modified by the external system. If such is the case, then the email resolution component 750 selects the dynamically right template without the human touch using tree-based approach with relevant information.

Once the email reply is sent to the vendor with the resolution information, for some type of tickets, external systems need to update the invoice state in the external ERP systems 705 used in ticket resolution life cycle. For highly confident tickets, the email resolution component 750 automatically updates the information using querying mechanism.

In case of tickets that are of type instructive, same mechanism as describes above can be applied to provide the resolution. In case of the tickets that involve computation, for example 'please perform the 2% discount on this invoice—12345' type of requests, the system 100 employs relevant computation on the targeted field—'total paid amount' using computation mechanism. In case of the tickets that fall under discrepancies/investigations, the system 100 employs deductive and abductive kind of reasoning in addition with knowledge base and provides the resolution. Further, the system 100 may also employ semantics-based entailment methodology to identify the differences among various entities and values. In case of the tickets where it is needed to provide reason for rejections—for example 'why this invoice is rejected, could you please provide us the reason', the system 100 may resolve such types of tickets by identifying the missing information through inference, provide relevant rejection to the end user leveraging process specific knowledge.

According to an example embodiment, the system 100 identifies subset of potential feedback documents. In an example, the system 100 employs deep-learning based word2vec in combination with duplicate document detection method using K-means clustering to identify the potential feedback documents. In an example, the system 100 performs semantic similarity between existing training corpus and the input feedback document, and based on similarity threshold, the system 100 identifies the feedback document that is fit for augmenting into the existing corpus for re-learning. If similarity threshold is less than 0.5, the system 100 considers the document as a potential feedback document for re-learning.

Subsequently, for a given feedback document, invoice text document and corresponding validated/corrected entities and values, the system 100 checks whether these entities and values are missing in the training corpus. If more than 50% of the entities are missing, the system 100 considers corresponding invoice document for re-learning. In an example, if there are 'n' entities specific to that given invoice request, and 90% of the entities are modified/validated, the system 100 considers this document as potential document for re-learning Once the potential document from the entire feedback corpus is identified, then the system 100 corrects/annotates the corresponding input document, email description/invoice attachment with the right categories, and entities and values. In case of ticket 'category' correction, the system 100 augments the potential category document to the existing training corpus and model can be re-learned to update the new or modified knowledge. In case of updating 'entities and values' in the corresponding invoice document, the system 100 may mark/add the right annotations based on the entity/value offsets/positions in the sequential order and preserve the right context for re-learning purpose. The system 100 may update the document for re-learning the entities and values. The re-learning can happen continuously as soon as there are 'n' numbers of feedback data points available for learning. As the new tickets from the vendor varies with respect to the kind of language entities they use, this feedback learning mechanism can help in acquiring the updated or new knowledge in specific business processes/industries.

Figure 10:
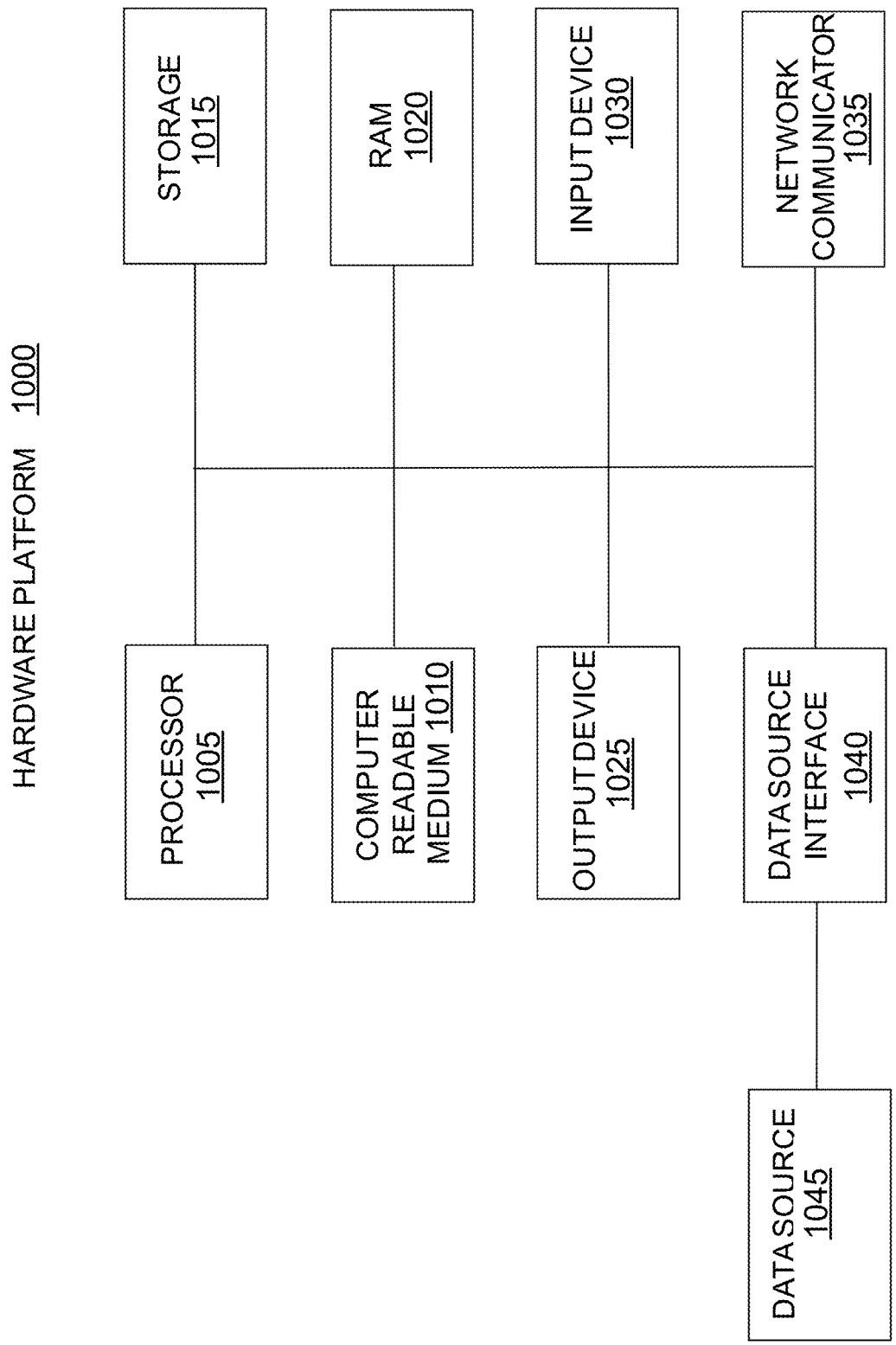
FIG. 10 illustrates a hardware platform for implementation of the system, according to an example embodiment of the present disclosure.

FIG. 10 illustrates a hardware platform 1000 for implementation of the system 100, according to an example of the present disclosure.

In an example embodiment, the hardware platform 1000 may be a computer system 1000 that may be used with the examples described herein. The computer system 1000 may represent a computational platform that includes components that may be in a server or another computer system. The computer system 1000 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 1000 may include a processor 1005 that executes software instructions or code stored on a non-transitory computer readable storage medium 1010 to perform methods of the present disclosure. The software code includes, for example, instructions to preprocess the claims, resolve exceptions, incorporate third party data, adjudicate the claims, and validate the adjudication. In an embodiment, the advisor 120 is a software code or a component performing the above steps.

The instructions on the computer readable storage medium 1010 are read and stored the instructions in storage 1015 or in random access memory (RAM) 1020. The storage 1015 provides a large space for keeping static data where at least some instructions could be stored for later execution. The stored instructions may be further compiled to generate other representations of the instructions and dynamically stored in the RAM 1020. The processor 1005 reads instructions from the RAM 420 and performs actions as instructed.

The computer system 1000 further includes an output device 1025 to provide at least some of the results of the execution as output including, but not limited to, visual information to users. The output device can include a display on computing devices. For example, the display can be a mobile phone screen or a laptop screen. GUIs and/or text are presented as an output on the display screen. The computer system 1000 further includes input device 1030 to provide a user or another device with mechanisms for entering data and/or otherwise interact with the computer system 1000. The input device may include, for example, a keyboard, a keypad, a mouse, or a touchscreen. In an embodiment, recommendations from the advisor 120 are displayed on the output device 1025. Each of these output devices 1025 and input devices 1030 could be joined by one or more additional peripherals.

A network communicator 1035 may be provided to connect the computer system 1000 to a network and in turn to other devices connected to the network including other clients, servers, data stores, and interfaces, for instance. A network communicator 1035 may include, for example, a network adapter such as a LAN adapter or a wireless adapter. The computer system 1000 includes a data source interface 1040 to access data source 1045. A data source is an information resource.

Figure 11:
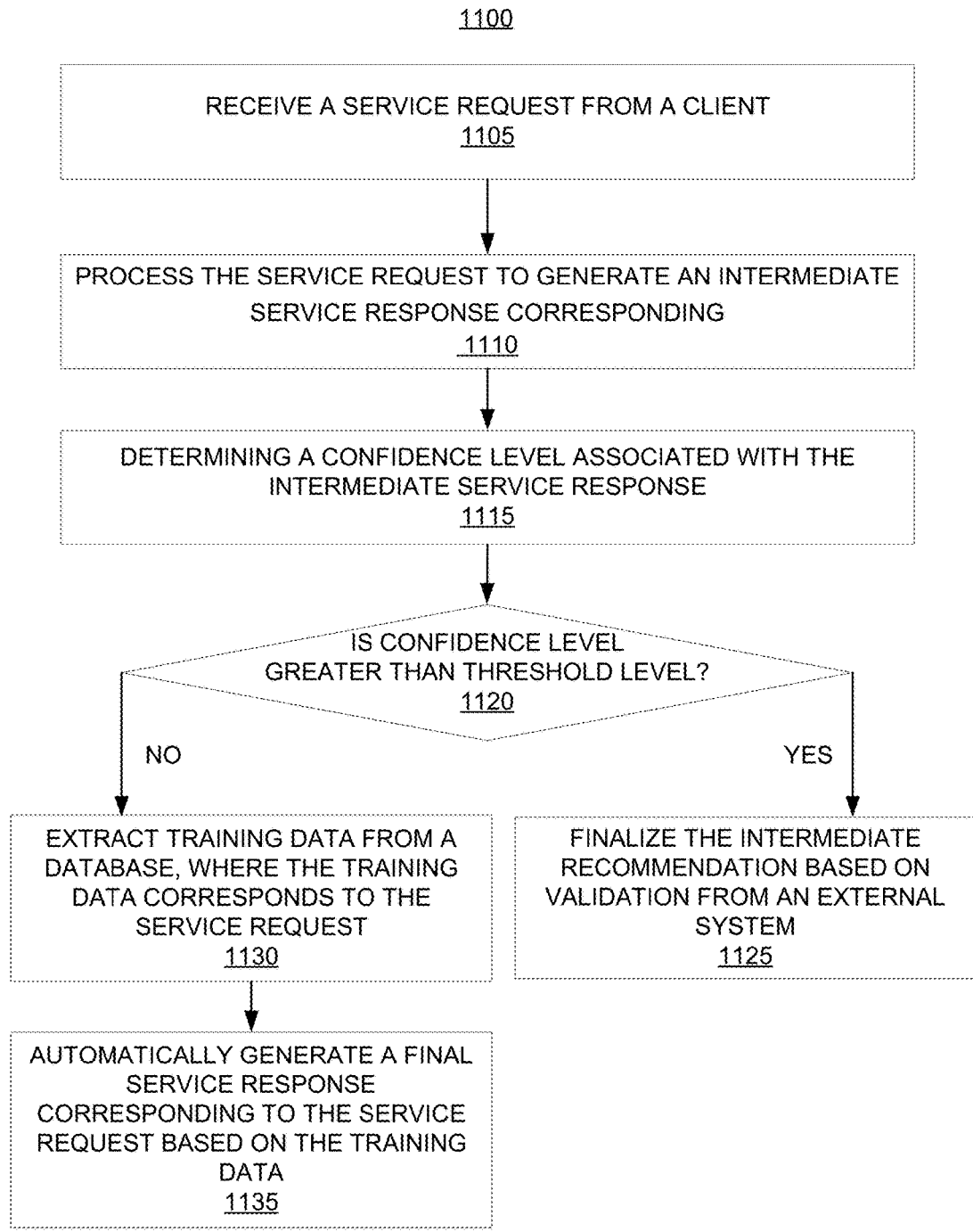
FIG. 11 illustrates a computer-implemented method depicting functionality of the system, according to an example embodiment of the present disclosure.

FIG. 11 illustrates a computer-implemented method 1100 depicting functionality of the system 100, according to an example embodiment of the present disclosure. For the sake of brevity, construction and operational features of the system 100 which are explained in detail in the description of FIG. 1-FIG. 7 are not explained in detail in the description of FIG. 8.

At method block 1105, the method 1100 commences with receiving a service request from a client. In an example, the service request is indicative of a service task to be performed and information associated with the service task.

At method block 1110, the service request is processed to generate an intermediate service response corresponding to the service request. The intermediate service response is generated as an intermediate recommendation.

At method block 1115, a confidence level associated with the intermediate service response is determined.

At method block 1120, it is ascertained whether the confidence level associated with the service response is below a pre-determined threshold level. On ascertaining that the confidence level is above the pre-determined threshold level ('YES'), at method block 1125, the intermediate recommendation is finalized based on validation from an external system.

Further, on ascertaining that the confidence level is below the pre-determined threshold level ('NO'), at method block 1130, training data is extracted from a database. The training data includes external system inputs and corresponds to the service request.

At method block 1135, a final service response is generated corresponding to the service request based on the training data. The final service response is generated as a final recommendation. In an example, this process is continued until the confidence level is reached or a number of iterations have reached. This is usually applicable to more difficult tasks as there may be insufficient training data.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system comprising:
   a curator to capture input data corresponding to a plurality of service tasks from an external source;
   a browser extension, in communication with the curator, the browser extension to collect intermediate service delivery data from the external source;
   a learner, in communication with the browser extension, the learner to store the input data and the intermediate service delivery data as training data;
   a receiver, in communication with the learner, the receiver to receive a service request from a client, wherein the service request is indicative of a service task to be performed and information associated with the service task; and
   an advisor, in communication with the receiver, the advisor to:
      process the service request to generate an intermediate service response corresponding to the service request, wherein the intermediate service response is generated as an intermediate recommendation;
      determine a confidence level associated with the intermediate service response;
      ascertain whether the confidence level associated with the service response is below a pre-determined threshold level; and
      on ascertaining that the confidence level is below the pre-determined threshold level, generate a final service response corresponding to the service request based on the training data, wherein the final service response is generated as a final recommendation.

2. The system as claimed in claim 1, wherein the input data includes question-answers pairs and dialog traces corresponding to each of the plurality of service tasks.

3. The system of claim 1, wherein the advisor is to determine the confidence level associated with the intermediate service response based on a confusion matrix.

4. The system of claim 1, wherein the advisor further is to, on ascertaining that the confidence level associated with the service response is above the pre-determined threshold level, finalize the intermediate recommendation based on validation from an external system.

5. The system as claimed in claim 1, wherein the system is trained with the input data and the intermediate service delivery data using machine learning techniques.

6. A system comprising:
   a receiver to receive a service request from a client,
   an advisor, in communication with the receiver, the advisor to:

process the service request to generate an intermediate service response corresponding to the service request, wherein the intermediate service response is generated as an intermediate recommendation;

determine a confidence level associated with the intermediate service response;

ascertain whether the confidence level associated with the service response is below a pre-determined threshold level;

on ascertaining that the confidence level is below the pre-determined threshold level, extract training data from a database, wherein the training data corresponds to the service request; and automatically generate a final service response corresponding to the service request based on the training data, wherein the final service response is generated as a final recommendation.

7. The system of claim 6, wherein the service request is indicative of a service task to be performed and information associated with the service task.

8. The system of claim 6, wherein the advisor determines the confidence level associated with the intermediate service response based on a confusion matrix.

9. The system of claim 6, wherein the training data is indicative of data gathered from external sources.

10. The system of claim 6, wherein the advisor further is to, on ascertaining that the confidence level associated with the service response is above the pre-determined threshold level, finalize the intermediate recommendation based on validation from an external system.

11. The system of claim 6, wherein the system further comprises:

a curator to capture input data corresponding to a plurality of service tasks from an external source;

a browser extension, in communication with the curator, the browser extension to collect intermediate service delivery data from the external source; and a learner, in communication with the browser extension, the learner to store the input data and the intermediate service delivery data as the training data.

12. The system as claimed in claim 11, wherein the input data includes question-answers pairs and dialog traces corresponding to each of the plurality of service tasks.

13. The system as claimed in claim 6, wherein the system is trained with the training data using machine learning techniques.

14. A computer-implemented method, executed by at least one processor, the method comprising:

receiving a service request from a client, processing the service request to generate an intermediate service response corresponding to the service request, wherein the intermediate service response is generated as an intermediate recommendation;

determining a confidence level associated with the intermediate service response;

ascertaining whether the confidence level associated with the service response is below a pre-determined threshold level;

on ascertaining that the confidence level is below the pre-determined threshold level, extract training data from a database, wherein the training data corresponds to the service request; and automatically generate a final service response corresponding to the service request based on the training data, wherein the final service response is generated as a final recommendation.

15. The computer-implemented method of claim 14, wherein the service request is indicative of a service task to be performed and information associated with the service task.

16. The computer-implemented method of claim 14, wherein the confidence level associated with the intermediate service response based on a confusion matrix.

17. The computer-implemented method of claim 14, wherein the training data is indicative of data gathered from external sources.

18. The computer-implemented method of claim 14, wherein the on ascertaining that the confidence level associated with the service response is above the pre-determined threshold level, the intermediate recommendation is finalized based on validation from an external system.

19. The computer-implemented method of claim 14 further comprising:

capturing input data corresponding to a plurality of service tasks from an external source;

collecting intermediate service delivery data from the external source; and storing the input data and the intermediate service delivery data as the training data.

20. The computer-implemented method of claim 19, wherein the input data includes question-answers pairs and dialog traces corresponding to each of the plurality of service tasks.

* * * * *